US007822708B1

(12) United States Patent
Mathew et al.

(10) Patent No.: US 7,822,708 B1
(45) Date of Patent: Oct. 26, 2010

(54) GLOBAL ATTRIBUTE MAPPING DATA IN AN ENTERPRISE INFORMATION SYSTEM

(75) Inventors: Ashwin J. Mathew, Karnataka (IN); Amit P. Tripathi, Allahabad (IN); Subhashini Subramaniam, Karnataka (IN)

(73) Assignee: Oracle America, Inc., Redwood City, CA (US)

( * ) Notice: Subject to any disclaimer, the term of this patent is extended or adjusted under 35 U.S.C. 154(b) by 1857 days.

(21) Appl. No.: 10/767,084

(22) Filed: Jan. 28, 2004

(51) Int. Cl.
G06F 7/00 (2006.01)
G06F 15/16 (2006.01)
G06F 17/00 (2006.01)
(52) U.S. Cl. .................. 707/610; 707/690; 709/201
(58) Field of Classification Search ......... 707/608–611, 707/622, 690, 999.103
See application file for complete search history.

(56) References Cited

U.S. PATENT DOCUMENTS

| | | | |
|---|---|---|---|
| 5,787,415 A * | 7/1998 | Jacobson et al. ............... | 707/2 |
| 5,913,214 A | 6/1999 | Madnick et al. | |
| 5,963,933 A | 10/1999 | Cheng et al. | |
| 6,295,541 B1 | 9/2001 | Bodnar et al. | |
| 6,493,721 B1 | 12/2002 | Getchius et al. | |
| 6,526,284 B1 | 2/2003 | Sharp et al. | |
| 6,609,123 B1 * | 8/2003 | Cazemier et al. ............... | 707/4 |
| 6,842,904 B1 * | 1/2005 | Bartz et al. .................. | 719/328 |
| 6,847,984 B1 | 1/2005 | Midgley et al. | |
| 6,941,326 B2 | 9/2005 | Kadyk et al. | |
| 7,007,041 B2 | 2/2006 | Multer et al. | |
| 7,010,540 B2 | 3/2006 | Sturms | |
| 7,117,264 B2 | 10/2006 | Becker et al. | |

(Continued)

FOREIGN PATENT DOCUMENTS

WO    WO-01/35211 A2    5/2001

OTHER PUBLICATIONS

Ng, Wee Siong et al. "PeerDB: A P2P-Based System for Distributed Data Sharing"; Nstitute of Electrical and Electronics Engineers: Proceedings 19$^{TH}$. International Conference on Data Engineering. (ICDE '2003). Bangalore, India, Mar. 5-8, 2003, International Conference on Data Engineering. (ICDE), New York, NY: IEEE, US, vol. Conf. 19, (Mar. 5, 2003), pp. 633-644.

(Continued)

*Primary Examiner*—John R. Cottingham
*Assistant Examiner*—Susan F Rayyan
(74) *Attorney, Agent, or Firm*—Osha • Liang LLP

(57) ABSTRACT

Methods and systems for identifying and maintaining relationships in a network of peer-to-peer enterprise information systems that include a unified entity-relationship system that has a number of entities, each of which has a number of attributes. Subsumed entity-relationship systems are coupled to the unified entity-relationship system, and the entities of the unified entity-relationship system are mapped to one another and to entities and attributes of entities of the subsumed entity-relationship systems. A join engine is coupled to the unified entity-relationship system for performing joins and splits to form related entities and an object model that is coupled to the join engine is available globally throughout the network. The object model contains the mapped relationships and is deployed in conjunction with a join model, the join model specifying transformations and queries required for forming an entity from a set of related entities.

39 Claims, 13 Drawing Sheets

U.S. PATENT DOCUMENTS

| | | | |
|---|---|---|---|
| 7,177,950 | B2 | 2/2007 | Narayan et al. |
| 7,181,746 | B2 | 2/2007 | Perycz et al. |
| 7,185,016 | B1* | 2/2007 | Rasmussen ................ 707/100 |
| 7,185,076 | B1* | 2/2007 | Novaes et al. .............. 709/223 |
| 7,412,436 | B2* | 8/2008 | Trappen et al. ................ 707/3 |
| 7,529,730 | B2* | 5/2009 | Potter et al. .................... 707/3 |
| 2002/0165724 | A1* | 11/2002 | Blankesteijn .................. 705/1 |
| 2002/0165725 | A1* | 11/2002 | Heusinkveld .................. 705/1 |
| 2002/0184213 | A1* | 12/2002 | Lau et al. ....................... 707/6 |
| 2002/0188656 | A1 | 12/2002 | Patton et al. |
| 2003/0061365 | A1 | 3/2003 | White et al. |
| 2003/0084056 | A1 | 5/2003 | DeAnna et al. |
| 2003/0120672 | A1* | 6/2003 | Bingham ................... 707/100 |
| 2003/0126199 | A1 | 7/2003 | Kadri et al. |
| 2003/0217171 | A1 | 11/2003 | Von Stuermer et al. |
| 2004/0073533 | A1 | 4/2004 | Mynarski et al. |
| 2004/0148304 | A1 | 7/2004 | Hempstead et al. |
| 2004/0172592 | A1 | 9/2004 | Collie et al. |
| 2004/0181575 | A1 | 9/2004 | Mallberg et al. |
| 2004/0249830 | A1 | 12/2004 | Sonkin et al. |
| 2005/0021575 | A1 | 1/2005 | Boyd et al. |
| 2005/0050068 | A1* | 3/2005 | Vaschillo et al. ............ 707/100 |
| 2006/0101422 | A1 | 5/2006 | Bourges-Waldegg et al. |

OTHER PUBLICATIONS

Celik, A. et al. "I-DG:A Secure Protocol for Disseminating Data to Subscribers Via IP Mulicast" Advanced Issues of E-Commerce and Web-Based Information System, 2002. (WECWIS 2002). Proceedings. Fourth IEEE International Workshop on Jun. 26-28, 2002, Piscataway, NJ, USA, IEEE, Jun. 26, 2002, pp. 1-8.

Grufman, S., et al. "Distributing semantic constraints between heterogeneous databases" Data Engineering, 1997. Proceedings. $13^{TH}$ International Conference on Birmingham, UK Apr. 7-11, 1997, Los Alamitos, CA, USA. IEEE Comput. Soc. US, Apr. 7, 1997, pp. 33-42.

Turker C., et al. "Towards maintaining integrity of federated databases" Information Technology, 1997. BIWIT '97., Proceedings of the Third Basque International Workshop on Biarritz, France Jul. 2-4, 1997, Los Alamitos, CA, USA, IEEE Comput, Soc. US, Jul. 2, 1997, pp. 93-100.

Bailey, James, et al. "Active Databases and Agent Systems_A Comparison" Technical Report 95-10, 1995, pp. 1-18.

Mukhopadhyay, D., et al. "Practical Approaches to Maintaining Referential Integrity in Multi-databases Systems." Research Issues in Data Engineering, 1993: Interoperability in Multidatabase Systems, 1993. Proceedings Ride-IMS '93., Third International Workshop on Vienna, Austria Apr. 19-20, 1993, Los Alamitos, CA, USA, IEEE Comput.Soc.US. Apr. 19, 1993, pp. 42-49.

Kamel, M.N., et al. "The Federated Database Management System: An Architecture of Distributed Systems for the 90's." Distributed Computing Systems, 1990. Proceedings., Second IEEE Workshop on Future Trends of Cairo, Eqypt Sep.30-Oct. 2, 1990, Los Alamitos, CA, USA, IEEE Comput.Soc, US, Sep. 30, 1990, pp. 346-352.

European Search Report dated Aug. 12, 2005 (5 pages).

* cited by examiner

GLOBAL ATTRIBUTE MAPPING DATA IN AN ENTERPRISE INFORMATION SYSTEM

RELATED U.S. APPLICATIONS

This Application is related to U.S. patent application Ser. No. 10/767,381 by Ashwin J. Mathew and Amit P. Tripathi, filed on the same date as the present application, entitled "Synchronizing and Consolidating Information from Multiple Source Systems of a Distributed Enterprise Information System", assigned to the assignee of the present invention and incorporated herein by reference.

This Application is related to U.S. Pat. No. 7,483,870 by Ashwin J. Mathew and Subhashini Subramaniam, filed on the same date as the present application and entitled "Fractional Synchronization and Consolidation in an Enterprise Information System", assigned to the assignee of the present invention and incorporated herein by reference.

This Application is related to U.S. patent application Ser. No. 10/767,165 by Amit P. Tripathi, filed on the same date as the present application and entitled "Context Based Logging in a Distributed Architecture Computer System", assigned to the assignee of the present invention and incorporated herein by reference.

This Application is related to U.S. patent application Ser. No. 10/767,502 by Amit P. Tripathi and Ashwin J. Mathew, filed on the same date as the present application and entitled "Batch Processing of Change Events in a Distributed Enterprise information System", assigned to the assignee of the present invention and incorporated herein by reference.

This Application is related to U.S. patent application Ser. No. 10/767,083 by Ashwin J. Mathew and Amit P. Tripathi, filed on the same date as the present application and entitled "Modeling and Performance of Data Transformations in a Distributed Enterprise Information System", assigned to the assignee of the present invention and incorporated herein by reference.

This Application is related to U.S. patent application Ser. No. 10/767,079 by Ashwin J. Mathew and Subhashini Subramaniam, filed on the same date as the present application and entitled "Sequencing of Data Consolidation and Synchronizing in an Enterprise Information System", assigned to the assignee of the present invention and incorporated herein by reference.

BACKGROUND OF THE INVENTION

1. Field of the Invention

Embodiments of the present invention relate to establishing and maintaining a map of relationships among entities in a distributed architecture peer-to-peer enterprise information system network.

2. Related Art

Typically source systems, such as databases (DBs), web servers etc., of an enterprise information system (EIS) have been used for storing and maintaining information. This information may be stored and maintained in the source systems by associating the information with data types. For example, referring to Prior Art FIG. 1, Human Resources (HR) user 122, email user 142, and employee record 132 are examples of data types for which information (values for 124, 126, 144, 134, 136, 138) is stored and maintained in source systems 110. More specifically, HR user 122 may be used for storing and maintaining the first name 124 and last name 126 of a person. Similarly, an email user 142 may be used for storing and maintaining the email address 144 of a person, while an employee record 132 may be used for storing and maintaining the first name 134, last name 136, and email address 138 for a person.

The data types may be stored and maintained in separate source systems 110. For example, the information associated with the HR user 122 may be stored and maintained in a database (HR DB) 120 while the information associated with the email user 142 may be stored and maintained in an email DB 140. Similarly, the information associated with employee record 132 may be stored and maintained in a payroll database (DB) 130.

The modification of information associated with particular data types may impact information associated with other data types, thus, the information in the different data types which may reside in different source systems 110 may need to be synchronized. For example, an instance of HR user 122 in HR DB 120, an instance of employee record 132 in payroll DB 130, and an instance of email user 142 in email DB 140 may all store information for a particular person. In this case, if the last name 126 of the HR user 122 is modified from "Jones" to "Smith," for example, the employee record 132 and the email user 142 for the particular person may also need to be modified to reflect the change in name (referred to hereinafter as "synchronization").

Prior Art FIG. 1 depicts one prior art approach to synchronizing information associated with various data types using a centralized server 170. Novell Dir XML, SunONE Metadirectory 5, IBM Directory Integrator, WebMethods, SunONE Integration Server, and BEA Weblogic Integration are examples of products that provide synchronization and consolidation of information that is stored and maintained in different source systems using a centralized server architecture similar to that depicted in FIG. 1.

In a centralized server architecture, modified information is communicated from the source systems 110 that store and maintain information to the centralized server 170 using connector views 150, which are associated with the source systems 110, to the combiner 160. The combiner 160 determines what data types may be impacted by modified information. Centralized server 170 stores and maintains information for all of the data types from all of the source systems 110 associated with the enterprise information system 100; thus, centralized server 170 may be used for providing a "metaview," e.g., consolidated view, for all the information that is stored and maintained in the source systems 110.

Continuing the example, although HR DB 120 may have an instance of the HR user 122, payroll DB 130 may have an instance of employee record 132, and email DB 140 may have an instance of email user 142 for the particular person, the centralized server 170 may also have values for the union of attributes (e.g., first name, last name, email address) for the particular person. Assuming, that HR DB 120 only includes an instance of HR user 122, payroll DB 130 only includes an instance of employee record 132, and email DB 140 only includes an instance of email user 142 for the particular person, then the "metaview" may include the value (e.g., "Jane") of first name 172, the value (e.g., "Jones") of last name 174, and the value (e.g., "Jane.Jones@sun.com") of the email address 176 for the particular person, thus, the "metaview" provides a way of seeing all the information that is stored and maintained in the source systems 110.

When modified information is communicated to the centralized server 170, the information is stored in the centralized server 170 and communicated back to the source systems 110, which may need to synchronize the information based on the modification. The information may be communicated from the centralized server 170 to the source systems 110 through the combiner 160 and the connector views 150.

Continuing the example of a particular person's last name being modified from "Jones" to "Smith," the last name 126, LN 136, and last name 174 may need to be updated for the particular person in the source systems 110 and the centralized server 170. Similarly, assuming that email address is formed, for example, as a concatenation of "first name," ".", "last name," and "@sun.com," the values of the email addresses (138, 144) associated with the email user 140 and employee record 132 may also need to be updated in the source systems 110 and the centralized server 170.

In this case, assume that the last name 126 of HR user 122, which is stored in HR DB 120, is first modified from "Jones" to "Smith." The new value (e.g., "Smith") for last name 126 may be communicated to the connector view CV1, which is associated with HR DB 120. CV 1 in turn communicates the new value to the combiner 160, which determines that the employee record 130 and the email user 140 may be impacted. The old value (e.g., "Wright") for the last name 174 in centralized server 170 is replaced with the new value (e.g., "Smith") for the last name 126 of HR user 122. Similarly, the value of email address 176 is also modified in the centralized server 170.

Although the centralized server 170's information (172, 176) has been synchronized, the source system 110's information (136, 138, 144) has not been synchronized yet. Thus, the modifications to last name 174 and email address 176 are communicated from the centralized server 170 to the combiner 160. The combiner 160 communicates the modifications to the last name 174 and email address 176 to the connector view CV2, which communicates the modifications to payroll DB 130. Payroll DB 130 updates the instance of employee record 132 based on the modifications it receives. Similarly, combiner 160 communicates the modifications of the email address 176 to the connector view CV3, which communicates the modifications to email DB 140. Email DB updates the instance of email user 142 based on the modifications it receives. After all of the synchronizations have been performed, last name 126, LN 136, and last name 179 are set to the value "Smith." Similarly, email address 138, email address 144, and email address 176 are set to the value "Jane.Smith@sun.com."

The centralized server approach of the prior art has numerous disadvantages. For example, the centralized server 170 becomes a performance bottle-neck as all modifications to information that is stored and maintained in source systems 110 must be communicated to the centralized server 170 in order to perform data synchronization and consolidation. Further, the centralized server architecture of Prior Art FIG. 1 cannot be scaled horizontally e.g., by adding additional server systems. Instead, the centralized server architecture can only be scaled vertically e.g., by increasing the power of the server system that executes the centralized server 170.

Also, synchronization between sources is made difficult because common information may be organized differently between the different sources. The data types may have different names, different data organizations, etc. from one source to another.

SUMMARY OF THE INVENTION

In a system having no centralized server, e.g., a peer-to-peer enterprise information system (EIS), it is desirable to provide an automated method for determining what source entities are used to form an output entity. In one embodiment, one or more global attribute object models are used to make this determination and provide such a mapping of data types. When changes occur to a source entity, the corresponding object model(s) can be invoked by a join engine peer(s) to determine the entities required to perform a data synchronization. The join engine peer(s) in turn sends queries to retrieve other source entities involved in the join, and then transforms the data retrieved in order to form the output entity. The output entity may then be published to the enterprise information system(s) that hold this output entity.

According to embodiments of the present invention, the global attribute object model defines the relationships between entities and attributes within a network of distributed architecture enterprise information systems. In conjunction with a join model, it aids the join engines in performing the needed queries and transformations required to perform joins and splits for the creation of new entities or modifications to existing entities, thus maintaining data consistency throughout a peer-to-peer network. The global attribute object model is maintained in a versioned store and is available to join engines throughout the distributed network, allowing the join engines to obtain a copy of the global attribute object models in the specific version of their configuration to the system. Data of the object model may be automatically obtained by loading the schema from a source peer, or it can be manually provided by a network user.

According to one embodiment, the global attribute object model is defined as including a set of unified entity-relationship (ER) models. The unified ER model is formed from entity-relationship models in the network of connected enterprise information systems within an enterprise. Entities within this model are mapped to entities within subsumed models and relationships between related entities specified. Relationships from the subsumed models may also be exported to the unified model, and new relationships established between entities logically belonging to different subsumed models.

Data consistency is maintained by an additional set of rules termed as join models according to one embodiment. Join models specify how a set of related entities may be used to form another (target) entity and also how the target entity may be split to form a set of entities. As changes occur to data in the system, it is the join models that serve to maintain data consistency. Join engine peers maintain join models. A change relevant to one join engine peer will be picked up by that peer and the join engine will use the global object model and its join model to query for its required data. Data transformations are then performed and output data types are broadcast.

Specifically, embodiments of the present invention provide methods and systems for identifying and maintaining relationships in a network of peer-to-peer enterprise information systems that include a unified entity-relationship system that has a number of entities, each of which has a number of attributes. One or more subsumed entity-relationship systems are coupled to the unified entity-relationship system, and the entities of the unified entity-relationship system are mapped to one another and to entities and attributes of entities of the subsumed entity-relationship systems. A join engine is coupled to the unified entity-relationship system for performing joins and splits to form related entities and an object model that is coupled to the join engine is available globally throughout the network. The object model contains the mapped relationships and is used in conjunction with a join model, the join model specifying transformations and queries required for forming an entity from a set of related entities. The entities are mapped by importing and exporting schemas of the attributes among the entities.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION OF THE INVENTION

Figure 1:
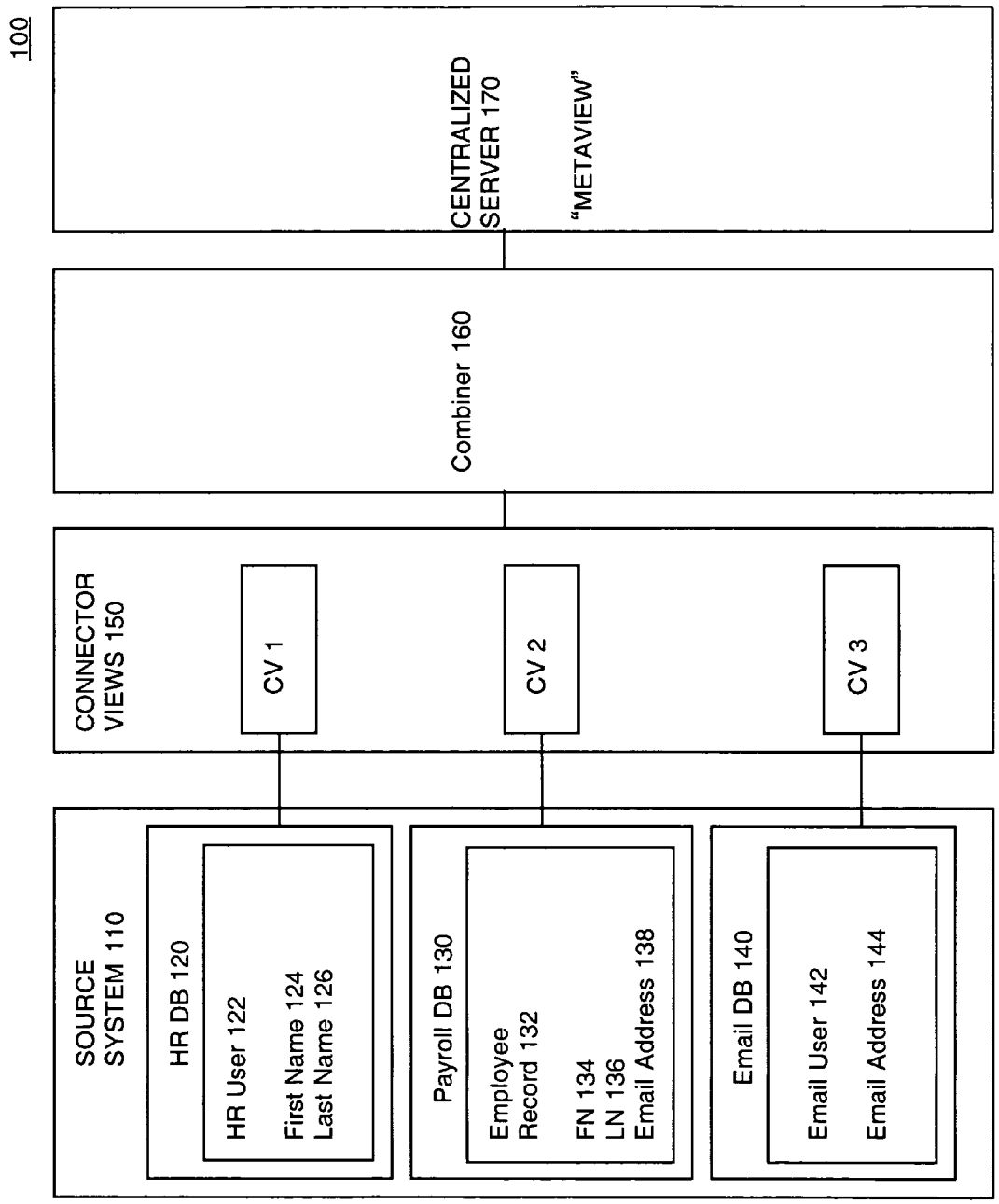
FIG. 1 is a block diagram of a prior art method for synchronizing and consolidating information from multiple source system using a centralized server.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reading," "transforming," "performing," "broadcasting," "creating," "joining," "splitting," "adapting," "receiving," "closing," "enabling," "generating," "logging," "tracing," "modifying", "assigning," or the like, refer to actions and processes of a computer system or similar electronic computing device. The computer system or similar electronic computing device manipulates and transforms data represented as physical (electronic) quantities within the computer system memories, registers or other such information storage, transmission or display devices.

Certain portions of the detailed descriptions of embodiments of the invention, which follow, are presented in terms of processes and methods (e.g., process 400 of FIG. 4, process 700 of FIG. 7 and process 800*b* of FIG. 8B). Although specific steps are disclosed herein describing the operations of these processes and methods, such steps are exemplary. That is, embodiments of the present invention are well suited to performing various other steps or variations of the steps recited in the flowcharts of the figures herein.

Although embodiments of the present invention are presented in terms of a specific peer-to-peer enterprise information system, it should be understood that embodiments of the present invention are suitable for any distributed architecture computer system application.

Figure 2:
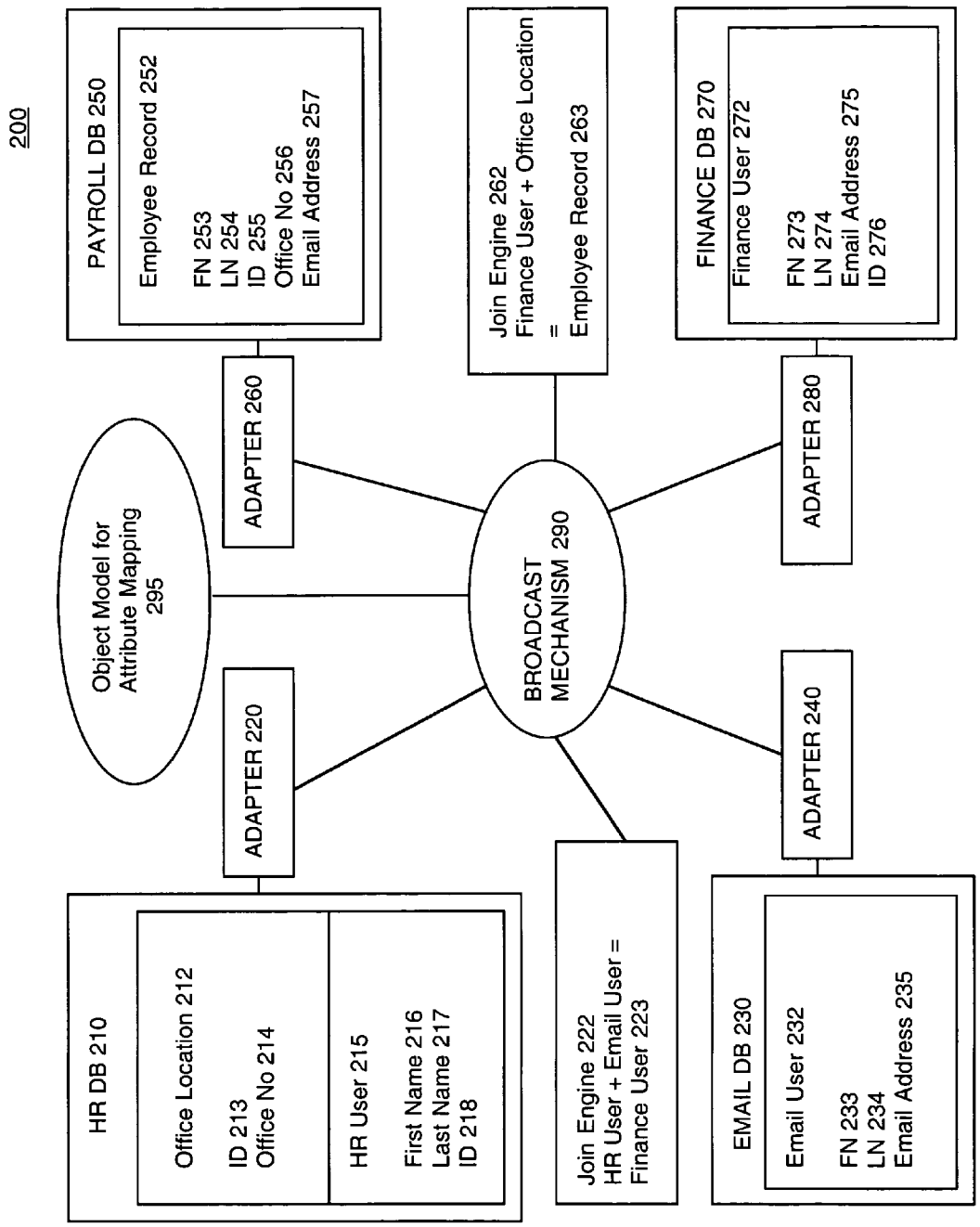
FIG. 2 is a block diagram illustrating an example of a peer-to-peer based enterprise information system for synchronizing and/or consolidating information from multiple sources in accordance with embodiments of the present invention.

FIG. 2 is a block diagram illustrating an exemplary enterprise information system 200 for synchronizing and/or consolidating information from multiple sources and performing transformations in accordance with embodiments of the present invention. Enterprise information system 200 may also be considered a uniform entity-relationship system and includes multiple source entity-relationship systems (210, 230, 270, 250), which store and maintain information (values for 216, 217, 218, 233, 234, 235, 273, 274, 275, 276, 213, 214 253, 254, 255, 256, 257) associated with instances of data types (212, 232, 272, 252). In the unified entity-relationship system 200, correlations between related attributes (e.g., attributes 216, 217, 218, 233, 234, 235, 273, 274, 275, 276, 213, 214 253, 254, 255, 256, 257) are defined and stored in object model 295. Join engines consult with the object model to determine these data relationships. Modifications to the information, e.g., change events, may be synchronized across instances of related data types by broadcasting the information on the peer-to-peer broadcast mechanism 290 as well as listening for and receiving the modified information from the broadcast mechanism 290. Broadcasting is a technique that is well known in the art.

Entity-relationship model or global attribute object model 295 in FIG. 2 provides a "blueprint" for traversing between different data types and attributes in the system. Object model 295 specifies how data types and their attributes are related to each other and is globally available to any peer in the system. For example, join engine 222 may need to know how to query Email user 232 to form a new attribute. Join engine 222 would obtain the answer as to how to form its query from object model 295. The relationship between data types and attributes as specified in the object model 295 is referred to herein as global attribute mapping data. In one embodiment, the global object model constructs its data according to schemas of the source peers. More information regarding the mapping of global attribute data follows with respect to the remaining figures.

In the present embodiment, modified information may be broadcast by adapters (220, 240, 280, 260) that are associated with the source systems (210, 230, 270, 250). Adapters are peers in the peer-to-peer system. The adapters (220, 240, 280, 260) may listen for and receive modified information that is broadcast. In one embodiment, information may be provided, listened for, received, and/or requested on channels that are dedicated to particular data types or to particular join engines, as will be described in more detail.

In one embodiment, information associated with one data type may be concatenated with information associated with another data type as a part of synchronizing the information associated with the data types. Join engines (222, 262) of FIG. 2 are also peers, along with adapters, in the peer-to-peer system. In the present embodiment, join engines (222, 262) may use join specifications (223, 263) to synchronize information associated with multiple source systems (210, 230, 270, 250) and to perform data transformations.

For example, a join specification 223 (e.g., HR user+email user=finance user) indicates that finance user 272 is a consolidation or concatenation of HR user 215 and email user 232. In other words, finance user 272 includes attributes (FN 273, LN 274, ID 276) that correlate to attributes of HR user 215 (first name 216, last name 217, ID 218) and attributes (email address 275) that correlate to attributes of email user 232 (email address 235). If the information associated with either HR user 215 or email user 232 is modified, join engine 222 may use join specification 223 to synchronize the information associated with finance user 272 by obtaining (e.g., through queries) the latest information for HR user 215 and email user 232 and providing the latest information to finance DB 270. The latest information may be broadcast on the broadcast mechanism 290 using channels and adapters as will be described in more detail.

In the present embodiment, adapters (220, 240, 260, 280) and join engines (222, 262) may be "peers" that communicate using peer-to-peer broadcast mechanism 290. In one embodiment, adapters and join engines may be implemented as peer processes which may or may not reside on separate computer systems.

In one embodiment, adapters and join engines may be partitioned. For example, referring to FIG. 2, adapter 220 may, among other things, provide channels dedicated to providing information associated with HR user 215 and office location 212. Adapter 220 may be partitioned into two adapters. In this case, for example, one of the adapters may provide a channel dedicated to providing information associated with a particular data type, e.g., HR user, and the other adapter may provide a channel for providing information associated with office location 212, another data type. Similarly, a join engine that handles two join specifications may be partitioned into two join engines (222, 262) where each join engine handles one of the join specifications.

Although FIG. 2 depicts join engines with one join specification (223, 263), each join engine may handle more than one join specification.

In one embodiment, queries may be associated with requests for information associated with data types. Adapters and join engines may obtain the information associated with the data types by monitoring the appropriate channel. For example, a join engine may request information (e.g., a query) for a particular data type on a channel that is dedicated to requesting information for a specific data type. The request may include a query for the information. An adapter for a source system that stores and maintains the information of the requested data type may listen for and receive the request. The query may be executed on the source systems to obtain the information. The source system may, in one embodiment, provide the information to the join engine by broadcasting it on a channel that is dedicated to the join engine that generated the query.

Implementing adapters and join engines as peers allows for distribution of the adapters and join engines across a set of server systems. Thus, multiple adapters and join engines may reside on the same server system or on separate server systems, depending on load requirements. Thus, a peer architecture, such as that depicted in FIG. 2, may be scaled vertically by increasing the processing power of the server systems on which the adapters and/or join engines reside. Similarly, the architecture may be scaled horizontally by partitioning adapters and join engines and executing the partitioned adapters and join engines on more server systems.

In one embodiment, modified information, e.g., change events, may be broadcast on channels that are dedicated to providing the information for the data type of the modification. Similarly, in one embodiment, modified information may be listened for and received on the channels that are dedicated to providing the information. In one embodiment, information associated with data types may be requested (e.g., queried) on channels (query channels) that are dedicated to the data type of the requested information. Similarly, in one embodiment, the requested information may be provided using query response channels that are dedicated to the peer that requested the information. According to one embodiment, Java Messaging Services (JMS) topics are used for providing information associated with data types on dedicated channels. In one embodiment, JMS queries are used for requesting and/or providing information associated with data types on dedicated channels.

In one embodiment, data types may be any structure that can be used for storing and maintaining values with a source system. In one embodiment, a source system may be a database, the data types may be tables, and instances of the data types may be rows of the table. In this case, attributes, such as HR user 214's first name 216, last name 217, and ID 218, may be columns of the table and values, such as the first name "Jane" and the last name "Smith," may be stored in data cells under the appropriate columns. In one embodiment a source system may be an object oriented database, the data types may be object classes, the attributes of the data types may be attributes of the object classes, and the instances of the data types may be objects that are associated with the object classes.

Although the present embodiment does not depict a centralized server for storing and maintaining a "metaview" that includes values for all of the information associated with the source systems, users may still be interested in accessing the values for all of the information associated with the source systems. In one embodiment, "consolidated views" provide users with the ability to access the values for all of the information associated with the source systems. However, the "consolidated views" may be implemented in a way that works with a peer architecture.

Referring to FIG. 2, for example, join engines (222, 262) with join specifications (223, 263) indicate how information associated with various data types (215, 232, 272, 212) may be consolidated or concatenated to provide "consolidated views" (e.g., finance user 272, employee record 252). For example, in the present embodiment, join specification 263 indicates that employee record is a concatenation of finance user and office location, thus, employee record 252 may be a "consolidated view" of finance user 272 and office location 212. More specifically, employee record 252 may include attributes (FN 253, LN 254, email address 257, ID 255) that correspond to attributes associated with finance user 272 (FN 273, LN 274, email address 275, ID 276) and attributes (ID 255, office no 214) that correspond to attributes associated with office location 212 (ID 213, office no 214). The data type that results from a data consolidation may be broadcast from the join engine over a data channel specific for that data type.

In one embodiment, global attribute mapping data, available from object model 295, may be used to determine the interrelationship of attributes. This information is made available globally and is readily consulted by join engine peers for determining dependency relationships between attributes. For example, if the value of the HR user 214's last name 217 is modified, email user 232's LN 234 may need to be synchronized based on the modification. In this case, global attribute mapping data may indicate that HR user 214's last name 217 is related to email user 232's LN 234. In one embodiment, a notation such as "HR user.last name=email user. LN" may be used to indicate that email user 232's LN 234 may be impacted by a modification to HR user 214's last name 217 or vice versa.

Similarly, email user 232's email address 235 may also need to be synchronized, for example, if the email address 235 is formed by concatenating first name "." last name "@sun.com." In this case, global attribute mapping data may indicate that email user 232's email address 235 is a concatenation of HR user 214's first name 216, HR user 214's last name 217, and "@sun.com." In one embodiment, a notation such as "HR user.first name+HR user.last name=email user..email address" may be used to indicate that email user's email address 235 may be impacted by a modification to either HR user 214's first name 216 or HR user 214's last name 217 or vice versa.

Global Attribute Mapping Data

Entities within a unified entity-relationship (E-R) system in a peer-to-peer EIS are mapped one to another. That is, correlations between attributes that contain the same or analagous information, (e.g. ID 213 and ID 218 of HR DB 210 and First Name 216 of HR User 215 and FN 273 of Finance DB 270 of FIG. 2) are identified or "mapped" to each other and the relationships are stored in Object Model 295 where they are available to join engines for performing transformations and traversing systems.

Figure 3A:
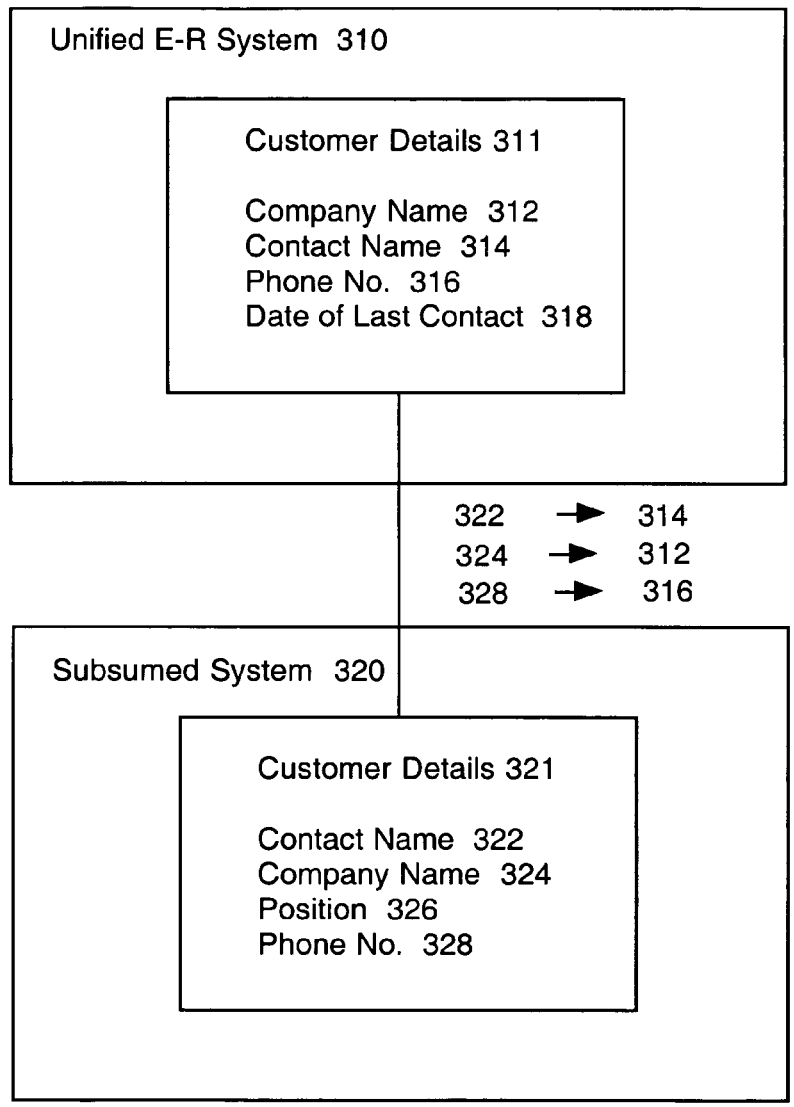
FIG. 3A is a block diagram depicting an example of a one-to-one mapping between an entity in a unified ER system and an entity in a subsumed system in accordance with an embodiment of the present invention.
Figure 3B:
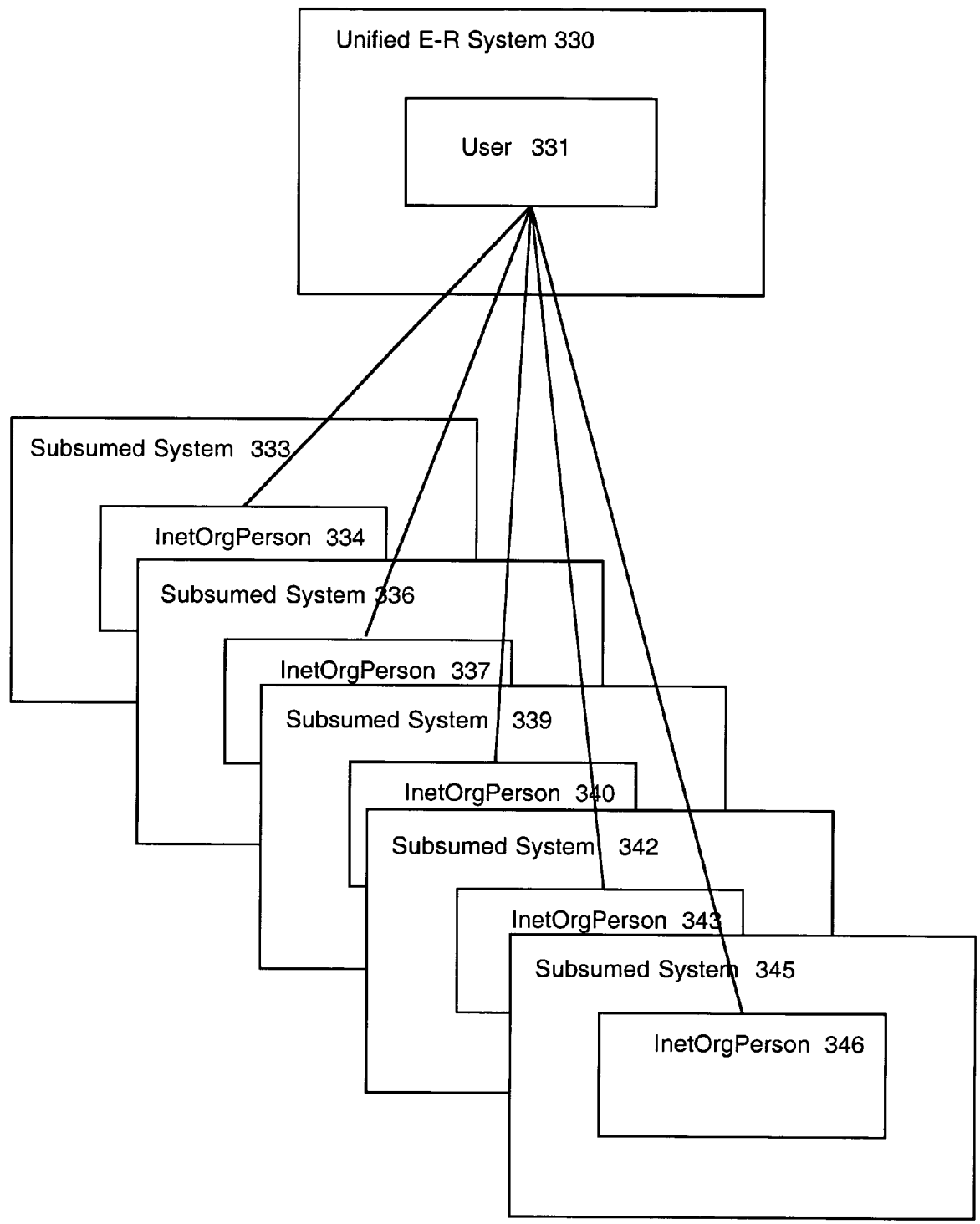
FIG. 3B is a block diagram illustrating an example of a mapping between an entity in a unified ER system and an entity in each of multiple subsumed systems in accordance with an embodiment of the present invention.
Figure 3C:
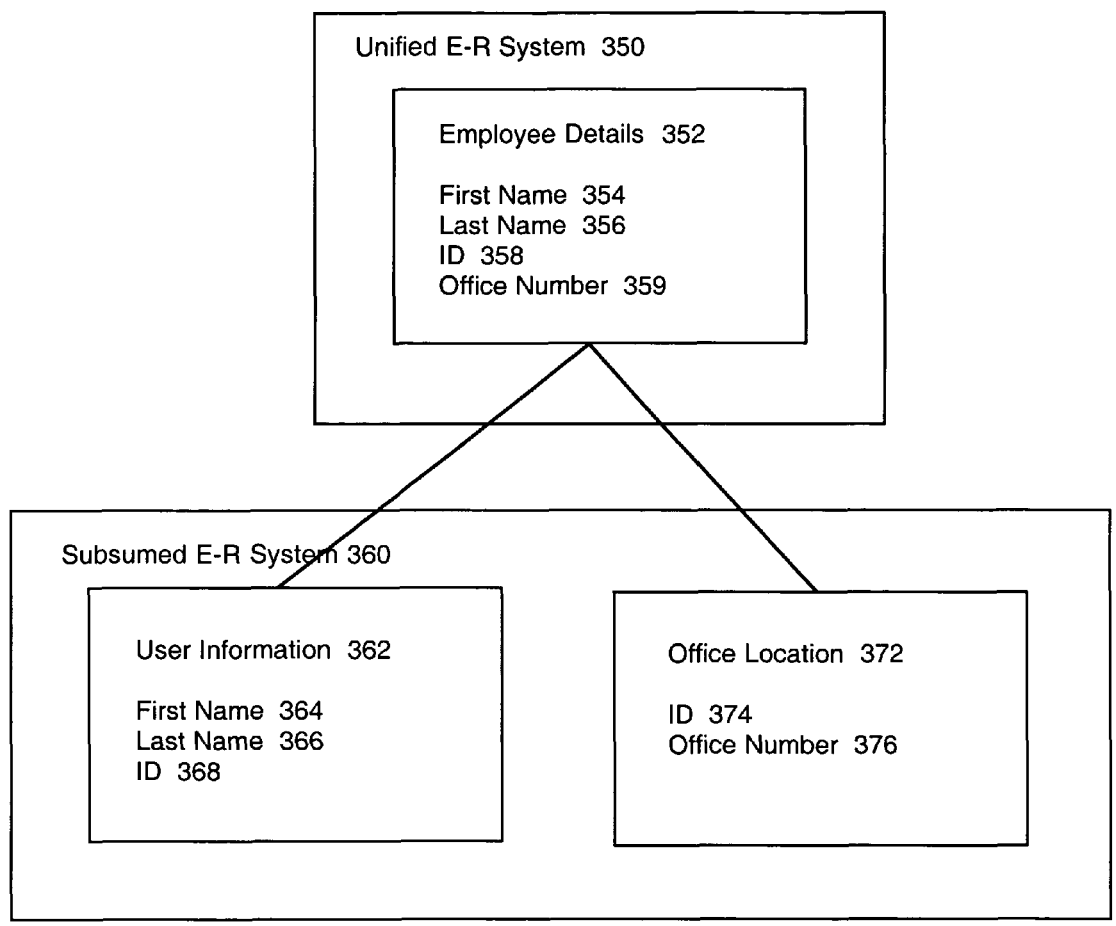
FIG. 3C is a block diagram illustrating an example of a mapping between attributes of an entity in a unified ER system and multiple entities within a specific subsumed system in accordance with an embodiment of the present invention.

Unified E-R systems may subsume other E-R systems within a network of peer-to-peer enterprise information systems in response to a user request that identifies the system to be subsumed. One or more entities in the subsumed E-R system are then mapped to corresponding entities in the unified E-R system. The mapping may be comprised of two steps, according to one embodiment. First, the schema of the subsumed E-R system is imported to the unified E-R system. This schema is a definition of the rows and columns of tables and the relationships between tables contained in a database or system. Once the schema is imported, a user may specify relationships (mapping information) between the related entities. These relationships are then stored in a globally available object model from which join engines may obtain the mapping information so as to determine where to direct queries and how to perform joins and splits in order to maintain data consistency within a network of connected peer-to-peer enterprise information systems. The mapping of related entities may be one-to-one mapping between entities, or attributes of entities, or there may be one-to-many or many-to-many mappings. FIGS. 3A, 3B and 3C illustrate some examples of various ways in which mapping may occur between subsystems and data types within a unified E-R system.

FIG. 3A is a block diagram 300a depicting a one-to-one mapping between an entity in a unified E-R system (e.g., system 200 of FIG. 2) and an entity in a subsumed system, in accordance with an embodiment of the present invention. In the present embodiment unified E-R model 310 is shown to have a single database entity, Customer Details 311. Customer Details 311 has attributes Company Name 312, Contact Name 314, Phone No. 316 and Date of Last Contact 318. Unified E-R Model 310 is subsuming System 320 which has entity Customer Details 321. Customer Details 321 has attributes Contact Name 322, Company Name 324, Position 326 and Phone No. 328.

At the discretion of a user, all or only a subset of the related attributes of Customer Details 321 of Subsumed System 320 are mapped to attributes of Customer Details 311 of Unified E-R model 310. In other words, Contact Name 322 may be mapped to Contact Name 314, Company Name 324 may be mapped to Company Name 312 and Phone No. 328 may be mapped to Phone No. 316, or, only one or two sets of relationships may be mapped in accordance with one embodiment of the present invention.

FIG. 3B is a block diagram 300b illustrating a multiple mapping of an entity User 331 in a unified ER system 330 to entity InetOrgPerson 334, 337, 340, 343 and 346 in each of five Subsumed systems 333, 336, 339, 342 and 345, in accordance with an embodiment of the present invention.

FIG. 3C is a block diagram 300c illustrating a mapping between multiple attributes of an entity in a unified ER system and multiple entities within a specific subsumed system in accordance with an embodiment of the present invention. In the present embodiment Unified E-R System 350 has an entity, Employee Details 352. Employee Details 352 has attributes First Name 354, Last Name 356, ID 358 and Office Number 359. Employee Details may be mapped to both entities User Information 362 and Office Location 372 of Subsumed E-R System 360. First Name 364 of User Information 362 may then be mapped to First Name 354 of Employee Details 352, Last Name 366 may be mapped to Last Name 356, ID 374 may be mapped to ID 358 and Office Number 376 may be mapped to Office Number 359, or any subset of the foregoing mappings may be performed.

Once the schemas of the entities are mapped, the next step is to specify relationships between the mapped entities and/or attributes in the unified E-R system. These relationships are expressed in a type-neutral query language that has capabilities equivalent to SQL (structured query language), and also takes into account the possibility that transformations may have to occur to form specific attributes involved in the relationship. Relationships may be directed, e.g., they may specify the direction in which they may be traversed from one entity to another. For further information regarding transformations, refer to patent application Ser. No. 10/767,083 entitled "Modeling and Performance of Data Transformations in a Distributed Information System" by inventors Ashwin J. Mathew and Amit P. Tripathi filed the same day herewith, the contents of which are incorporated herein.

Figure 4A:
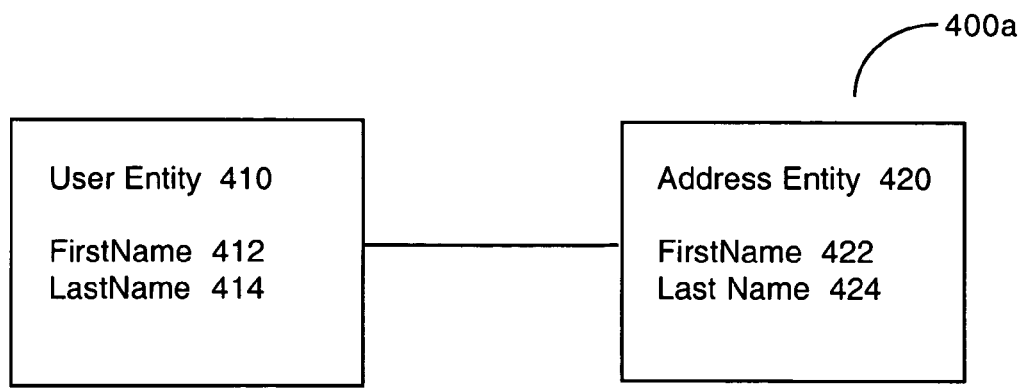
FIG. 4A is a block diagram depicting an example of a relationship between two entities having identical attributes in accordance with one embodiment of the present invention.

FIG. 4A is a block diagram 400a depicting a specified relationship between two entities having identical attributes in accordance with one embodiment of the present invention. In the present embodiment, User Entity 410 and Address Entity 420 have the same attributes. FirstName 412 and LastName 414 are attributes of User Entity 410. FirstName 422 and LastName 424 are attributes of Address Entity 420. The relationship between these entities and attributes can be specified as User.FirstName=Address.FirstName AND User.LastName=Address.LastName. These relationships, once specified, may be stored in a unified entity-relationship (object) model that is globally accessible to peers throughout the network of peer-to-peer enterprise information systems, e.g., Object Model for Attribute Mapping 295 of FIG. 2. The object model may then be stored in a versioned store, e.g., a store containing multiple versions that are compatible with a variety of system configurations that may be present within the network. This enables systems to deploy a specific version that is compatible with their configuration. Join engines may obtain a copy of the object model from the versioned store and use it in conjunction with a join model to enforce data consistency within the network of connected peer-to-peer enterprise information systems.

Figure 4B:
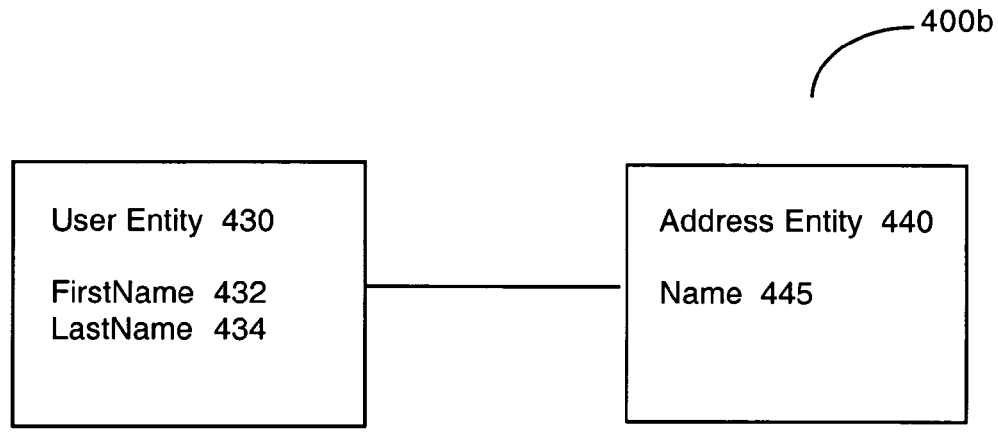
FIG. 4B is a block diagram illustrating an example of a more complex relationship between two entities in which the attributes are related by a concatenation of attributes from one entity to the other, in accordance with an embodiment of the present invention.

FIG. 4B is a block diagram 400b illustrating an example of a more complex relationship between two entities. In this example, the attributes are related by a concatenation of attributes from one entity to the other, in accordance with an embodiment of the present invention. Name 445 attribute of Address Entity 440 is, according to the present example, formed by concatenating FirstName 432 and LastNAME 434 of User Entity 430. In this case, the relationship can be specified as Address.Name=f(User.FirstName, User.LastName), when traversing the relationship from User Entity 430 to Address Entity 440, where the function "f" concatenates the User.FirstName 432 and User.LastName 434 attributes. If traversing the graph from Address Entity 440 to User Entity 430, the relationship is specified as User.FirstName-f'(Address.Name) AND User.LastName=f"(Address.Name), where the function f' extracts the FirstName 432 attribute and the function f"" extracts LastName 434 from the Name 445 attribute.

In addition, cardinality may also be defined for relationships. This may be expressed in general terms as 1-1, 1-n or n-n cardinality, or it may specifically define the value of 'n.' For example, if a system requires that a User have three associated Address entities (e.g., Home Address, Work Address and Email Address), the cardinality between User and Address would be 1-3.

Table 1 below shows an example (in XML) of a relationship. This expresses a relationship between a USER type (on the left hand side, or LHS, of the relationship) and an ADDRESS type (on the right hand side, or RHS, of the relationship), which states that 1 USER may have N ADDRESSes (1-n cardinality), which are linked by an expression stating that the ADDRESS's ADDRESS-ID must be contained in the USER's ADDRESS-LIST.

Relationships may also include a specified cascaded delete flag. If this flag is specified, then when an entity is deleted, its flagged related entities are also deleted. Table 1 shows a cascade delete flag that is set to LR, which indicates Left-to-Right. This means that if the entity on the left hand side of the relationship (USER) is deleted, all related entities on the right hand side of the relationship (ADDRESSes with ADDRESS-ID in USER's ADDRESS-LIST) will be deleted. The cascade delete flag may also be RL (inverse of the above), BOTH (deletes cascading in both directions, LR and RL), or NONE (no cascade delete).

TABLE 1

```
<Relation name="USER-ADDRESS">
    <lhsType type="USER" cardinality="1"/>
    <rhsType type="ADDRESS" cardinality="N"/>
    <expression>
        <operator>CONTAINS</operator>
        <lhsParam type="USER">ADDRESS-LIST</lhsParam>
        <rhsParam type="ADDRESS">ADDRESS-ID</rhsParam>
    </expression>
    <cascade-delete direction="LR"/>
</Relation>
```

Figure 5:
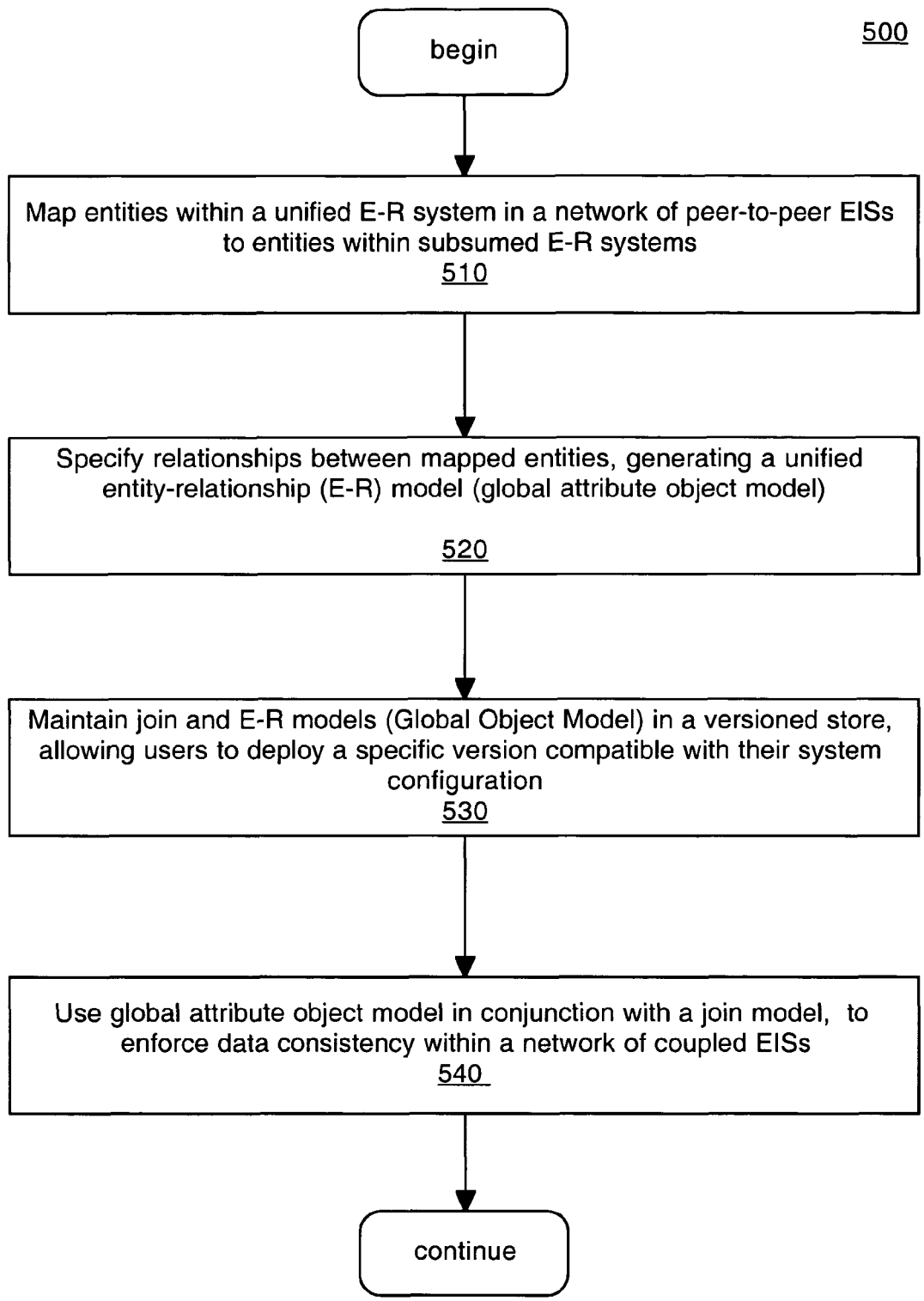
FIG. 5 is a flow chart of a process of generating a global attribute object model in accordance with one embodiment of the present invention.

FIG. 5 is a flow chart of a computer-implemented process 500 of generating a global attribute object model in accordance with one embodiment of the present invention. At step 510 of process 500, entities within a unified E-R relationship system are mapped to entities within subsumed E-R systems. The objective of mapping entities in a network of peer-to-peer EIS's is that in each system there are databases (entities) having tables of types of data (attributes) and it is desirable to ensure that data integrity is maintained across the databases since there are related bits of data. Thus, the related data are mapped to each other and a relationship defined by a key that maps one set of data to its related sets of data. This enables a join engine to traverse the related entities and attributes and perform the necessary additions, deletions or modifications in response to changes that occur in the network, thus maintaining data consistency across the related systems.

This mapping is described in detail in the foregoing discussion with respect to FIGS. 3A, 3B and 3C. This assumes an initial correlation of a unified system in which entity relationships are established, and the unified system, e.g., system 200 of FIG. 2, is incorporating information from other systems.

E-R models or schemas from underlying (subsumed) enterprise information systems may be directly imported to the schema (unified E-R model) of a unified E-R system. This would cause entities and relationships from the imported E-R model to be copied into the unified E-R model. These entities may then be manually related with other entities within the unified E-R model. It is also possible that some of the imported entities would be replaced with entities already present in the unified E-R model. For example, if a User entity exists in both the imported E-R model and the unified E-R model, and User entity in the imported E-R model may be directly formed from the User entity in the unified E-R model, the single User entity already present in the unified E-R model may be retained.

At step 520 of process 500, according to one embodiment and as described in FIGS. 4A and 4B above, relationships between mapped entities are specified and a unified entity-relationship model (global attribute object model) is formed. The relationship includes the relationship of the entities, cardinality of the relationship and a flag to indicate if cascading deletes are appropriate and for which sides of the relationship. This specification is made by a user and input to the system.

At step 530 of FIG. 5, according to one embodiment, the object model may then be stored in a versioned store, e.g., a store containing multiple versions that are compatible with a variety of system configurations that may be present within the network. This enables systems to deploy a specific version that is compatible with their configuration.

Figure 6:
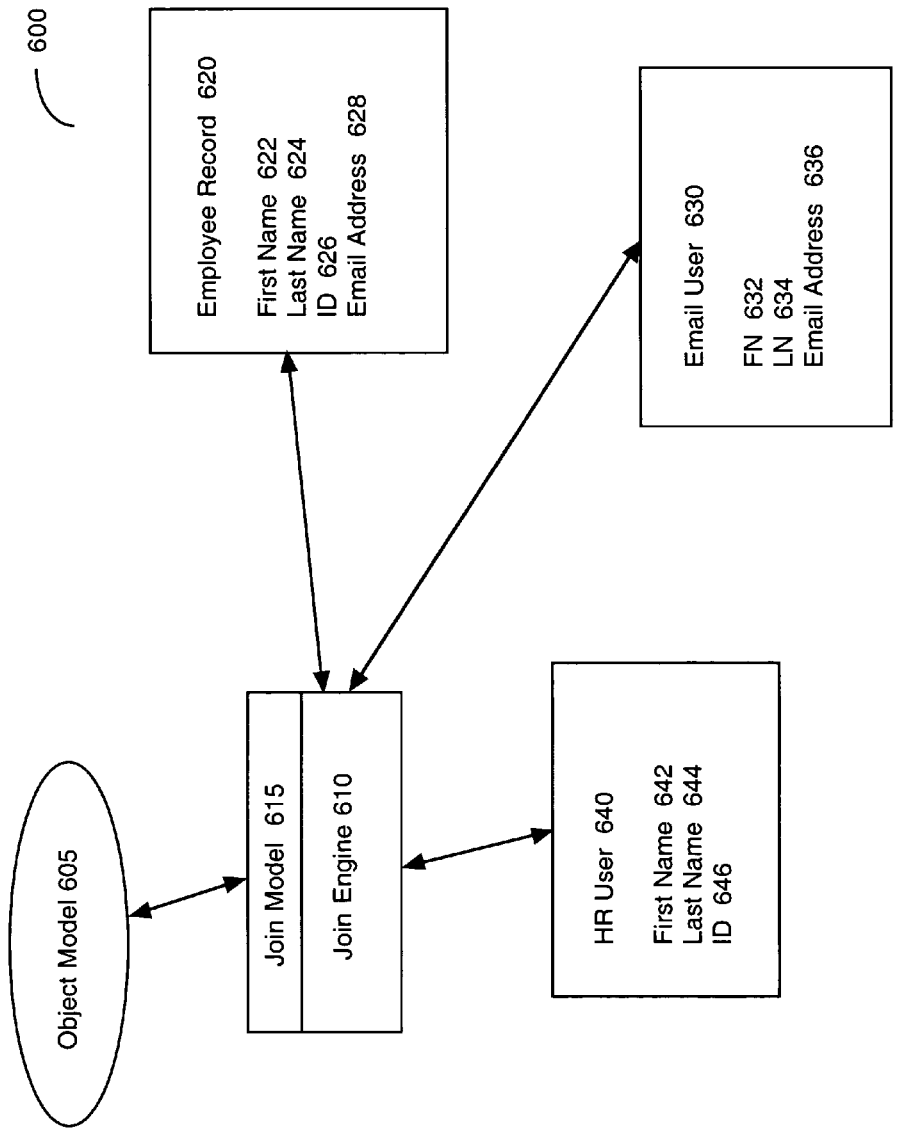
FIG. 6 is a block diagram illustrating an exemplary join model and associated entities, according to one embodiment of the present invention.

At step 540, join engines (e.g. join engines 222 and 262 of FIG. 2) may, according to one embodiment of the present invention, obtain a copy of the object model from the versioned store and use it in conjunction with a join model to enforce data consistency within the network of connected peer-to-peer enterprise information systems. A join model specifies complex transformations and queries required to form an entity from a set of related entities. Join models and transformations are discussed in detail in patent application Ser. No. 10/767,083 entitled "Modeling and Performance of Data Transformations in a Distributed Information System" by inventors Ashwin J. Mathew and Amit P. Tripathi filed the same day herewith, the contents of which are incorporated herein. FIG. 6 along with FIGS. 7A and 7B below illustrate one embodiment of the performance of a join model.

Figure 7A:
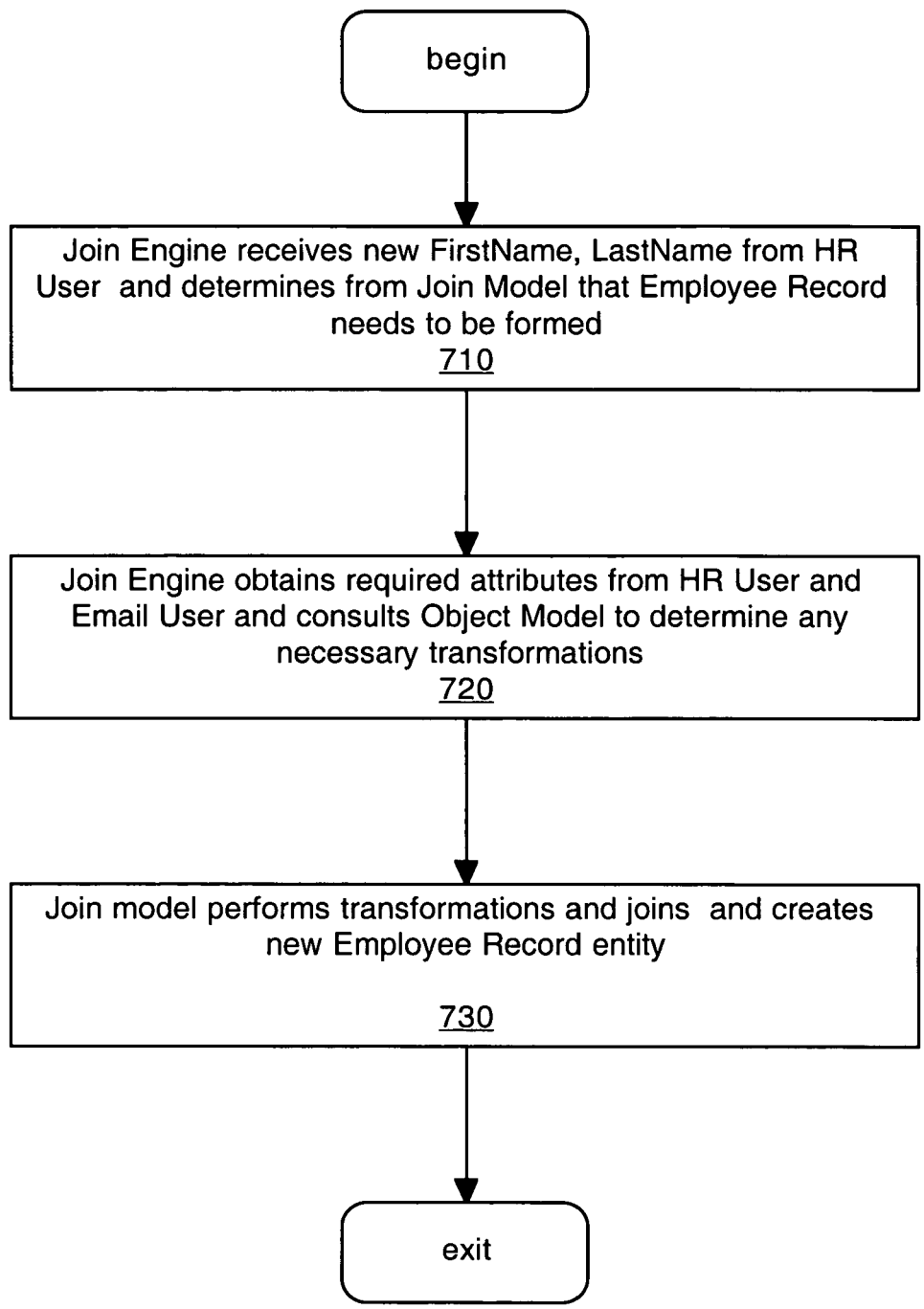
FIG. 7A is a flow diagram of a process of a join engine performing a join in accordance with one embodiment of the present invention.
Figure 7B:
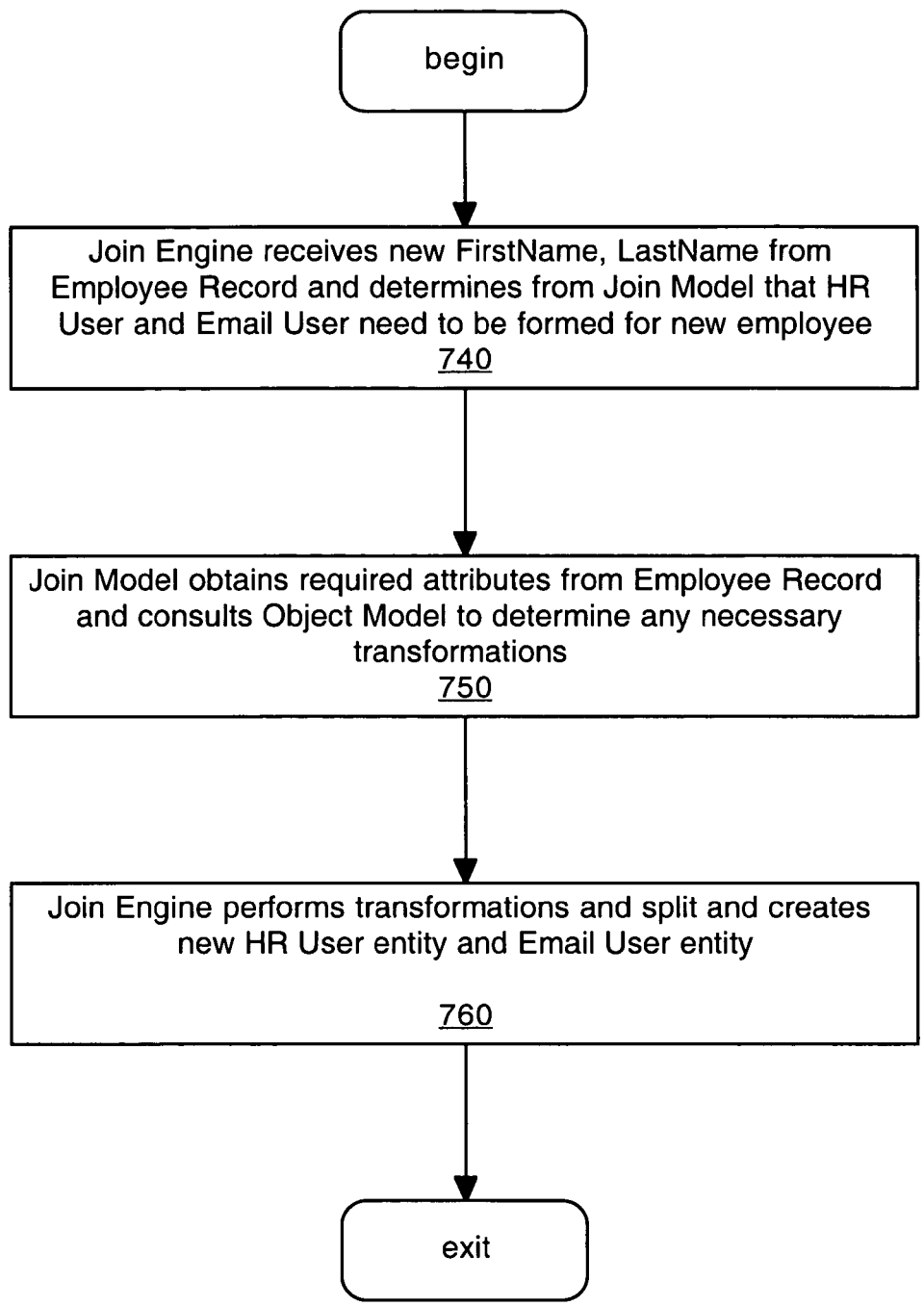
FIG. 7B is a flow diagram of a process of a join engine performing a split in accordance with one embodiment of the present invention.

FIG. 6 is a block diagram 600 illustrating an exemplary join engine 610 having a join model 615 and associated entities, according to one embodiment of the present invention. FIG. 6 will be discussed in concert with FIGS. 7A and 7B. FIG. 7A is a flow diagram of a computer implemented process 700a of a join engine performing a "join" in accordance with one embodiment of the present invention. FIG. 7B is a flow diagram of a process 700b of a join engine performing a "split" in accordance with one embodiment of the present invention.

As stated above, the unified E-R model (object model) is used in conjunction with a join model to enforce data consistency within a network of connected peer-to-peer enterprise information systems. In one embodiment, Join Model 615 of FIG. 6 may specify, for example, that an Employee Record entity 620 may be formed by selecting and transforming attributes of HR User entity 640 and Email User entity 630 (a "join"). Also, an HR User entity 640 and an Email User entity 630 may be formed by selecting and transforming an Employee Record entity 620 (a "split").

Referring to FIG. 7A, according to one embodiment, at step 710 of process 700a Join Engine 610, listening to a channel associated with HR User 640, discovers that a new FirstName 642 and LastName 644 have been added to HR User 640. From knowledge obtained from Join Model 615, Join Engine 610 determines that Employee Record entity 620 needs to be formed.

In accordance with one embodiment of the present invention, by consulting Object Model 605 and Join Model 615, at step 720 Join Engine 610 determines the relationship of entities and attributes and selects the values of ID 646, First Name 642 and Last Name 644 from HR User 640 and the value of Email Address 636 from Email User 630, and consults Object Model 605 for any transformations that may need to be performed.

At step 730 of process 700a, in one embodiment, Join Engine 610 performs transformations and joins the selected data to form a new Employee Record 620 and process 700a is exited.

Referring now to FIG. 7B in conjunction with FIG. 6, at step 740, Join Engine 610 receives a broadcast from Employee Record 620 containing a new First Name 622 and a new Last Name 624, according to an embodiment of the present invention. From knowledge obtained from Join Model 615, Join Engine 610 determines from Join Model 615 that a HR User entity 640 and an Email User entity 630 need to be formed for a new employee.

At step 750 of process 700b, according to one embodiment, Join Engine 610, from Join Model 615 and Object Model 605, determines transformations to be performed and obtains the required attributes from Employee Record 620.

At step 760, Join Engine 610 then performs the necessary transformations (e.g., EmailUser.FN=EmployeeRecord.First Name AND EmailUser.LN=EmployeeRecord.Last Name). Join Engine 610 then performs a split and creates a new HRUser entity and a new EmailUser entity in accordance with an embodiment of the present invention.

Figure 8:
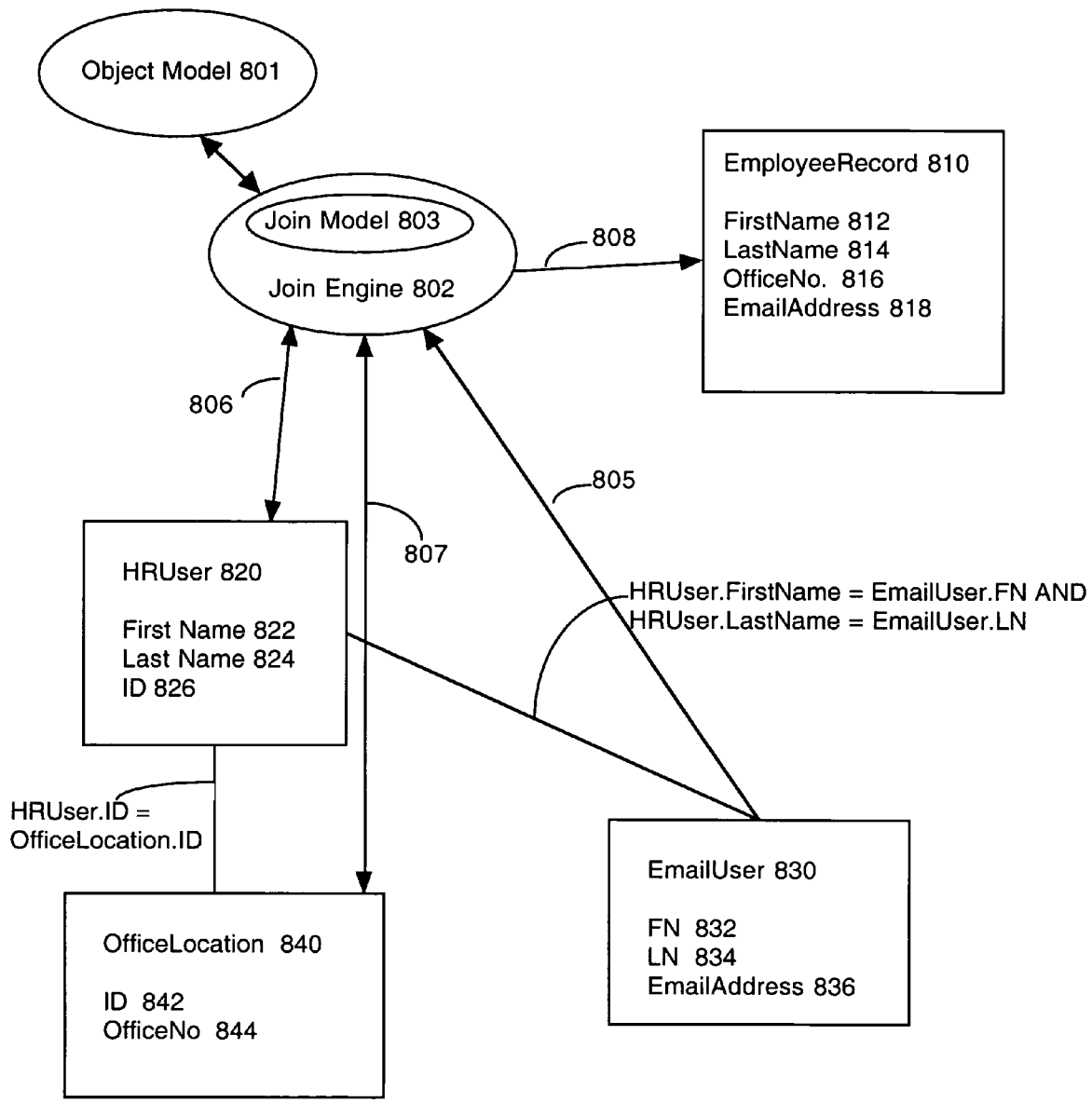
FIG. 8 is a block diagram illustrating an example of a join engine using an object model when implementing a change that occurs within a distributed peer-to-peer network, according to one embodiment of the present invention.

FIG. 8 is a block diagram illustrating an example of a Join Engine 802, having a Join Model 803, using Object Model 801 when implementing a change that occurs within a distributed peer-to-peer network 800, according to one embodiment of the present invention. Join models may consist of input entities that are not all directly related. In such situations, all the input entities cannot be queried at once. Directly related entities will be queried first, then entities related to those, and so on, traversing a graph of related entities until all required input entities have been queried and a join may proceed to transformation in order to form an output entity.

For the purposes of differentiating between relationships and queries in FIG. 8, relationships are shown by lines having no arrows and queries are indicated by lines having double-ended arrows. A line having a single-ended arrow (e.g., 805 and 808) indicates one-way communication.

According to one embodiment, Join Model 803 may specify that the entity EmployeeRecord is formed from the entities EmailUser, HRUser and OfficeLocation. In Object Model 801, relationships are stored and EmailUser 830 is related to HRUser 820 by the relationship HRUser.FirstName=EmailUser.FN AND HRUser.LastName=EmailUser.LN. Also, HRUser 820 is related to OfficeLocation 840 by the relationship HRUser.ID=OfficeLocation.ID.

If a change occurs on EmailUser 830 and is broadcast 805 to Join Engine 802, HRUser 820 will be queried (806) first, as Join Engine accesses Object Model 803 and determines EmailUser's relationship(s). When Join Engine 802 queries HRUser 820, it obtains from Object Model 801 HRUser's relationship(s). After the results of query 806 are obtained, OfficeLocation 840, now revealed to be related to HRUser, will be queried by query 807. It is not possible for Join Engine 802 to query OfficeLocation 840 just based on a change to EmailUser. After the query to HRUser the relationship between HRUser and OfficeLocation is revealed and the query 807 may be performed.

In accordance with embodiments of the present invention, once the queries 806 and 807 are performed and the required attributes FirstName 822, LastName 824, Office Location 844, and with the attribute EmailAddress 836 of EmailUser that accompanied the change broadcast 805, a new EmoloyeeRecord 810 entity can be formed by JoinEngine 802 and published 808 to EmployeeRecord 810.

Figure 9:
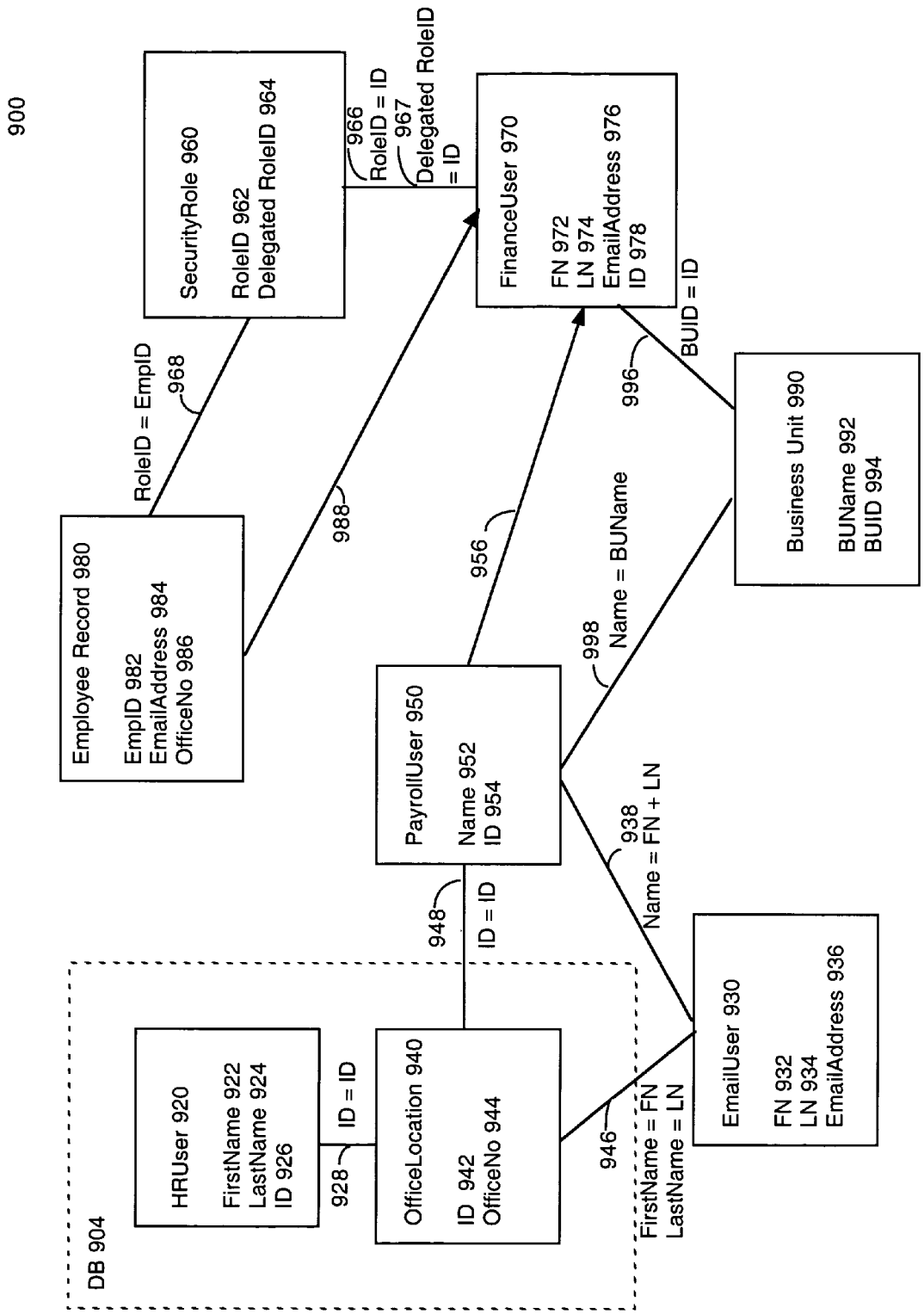
FIG. 9 is a block diagram illustrating a map of exemplary entity relationships within a distributed architecture peer-to-peer enterprise information system network, according to one embodiment of the present invention.

FIG. 9 is a block diagram illustrating entities identified within a global object model map 900, according to one embodiment of the present invention. This map or graph shows a complex set of relationships that may be typical of a relationship map as stored in a global attribute object model for an enterprise having a network of peer-to-peer enterprise information systems.

According to one embodiment, Database 904 stores entities HRUser 920 and OfficeLocation 940 and has an established relationship identity 928 within its local registers of ID=ID. To form the global object model 900, a user may point to database 904 and indicate that the schema from database 904 is to be imported into global object model 900. Database 904 may then be queried as to what tables it contains. The database 904 would reply with HRUser 920 and OfficeLocation 940 and these two entities are related by a register that identifies HRUser ID 926=OfficeLocation ID 942. That knowledge is then imported into global object model 900.

In another embodiment, a user may import entity PayrollUser 950 from a payroll system and the user may then explicitly map a relationship 948 to OfficeLocation 940 since there's no way for the system to know how to map the two. These relationships are "business rules" in that the system has been created so that these IDs are equal. Thus, in a similar fashion, EmailUser 930 was imported and mapped to both PayrollUser 950 by relationship 938, Name+FN+LN and to OfficeLocation 940 by relationship 946, FirstName=FN AND LastName=LN. This mapping continues in the same fashion until the user establishes global object model 900 with all of the entities deemed as necessary for relating data and maintaining data consistency throughout the network of enterprise information systems. In the present embodiment these also include BusinessUnit 990, FinanceUser 970, SecurityRole 960 and Employee Record 980.

Still referring to FIG. 9, since all entities are not related to all other entities, there is, according to one embodiment of the present invention, a concept of extending relationships, or inheriting them. For purposes of discussion, consider that the non-arrow lines connecting entities within object model 900 represent the general relationships established between the entities and the arrows represent extensions between non-related entities. Consider, for example, that PayrollUser 950 is related to Business Unit 990 by Name=BUName, relationship 998. Also, consider that FinanceUser 970 is related to Business Unit 990 by BUID=ID, relationship 996. Thus, PayrollUser 950, considered in this example a child class entity, inherits from Business Unit 990, its parent class entity, a relationship with (or an extension to) FinanceUser 970, that is accessed by traversing relationship 998 Name=BUName. If a join was being performed for FinanceUser 970 that required access to data from PayrollUser 950, the traverse would be reversed, since FinanceUser would be inheriting via Business Unit 990, and the traversed relationship would be BUID=ID, relationship 996.

Thus, an entity, considered a child class entity may inherit all the attributes from a parent class entity and also its parent class entity's relationships. In order to perform a join, it's entirely possible that a join engine may have to traverse multiple relationships (walk the graph) in order to obtain all the required information. Each step along the graph that is a partial solution will point the join engine to the next step that it needs.

In the examples covered so far, there has only been 1-1 cardinality in the relationships. In one embodiment of global object model 900 there is a different cardinality. This is shown in the relationships 966 and 967 between SecurityRole 960 and FinanceUser 970. Consider that PayrollUser 950 may be both employees and contractors. In this case, assuming employees have an assigned delegated security role that is not available to contractors, the relationship between FinanceUser 970 and SecurityRole 960 may be established so that the employee is related by both RoleID=ID and Delegated RoleID=ID, but the contractor is only related by RoleID=ID. FinanceUser 970 and PayrollUser 950 may be able to find SecurityRole 960 using RoleID=ID. However, Employee Record, only being concerned with employees, may wish to access FinanceUser 970 not only RoleID=ID, but also to narrow the entities to those of employees only, by traversing the relationship 967 of delegated RoleID=ID. Thus, the cardinality of the relationship between Employee Record 980 and FinanceUser 970 is 1:n.

Figure 10:
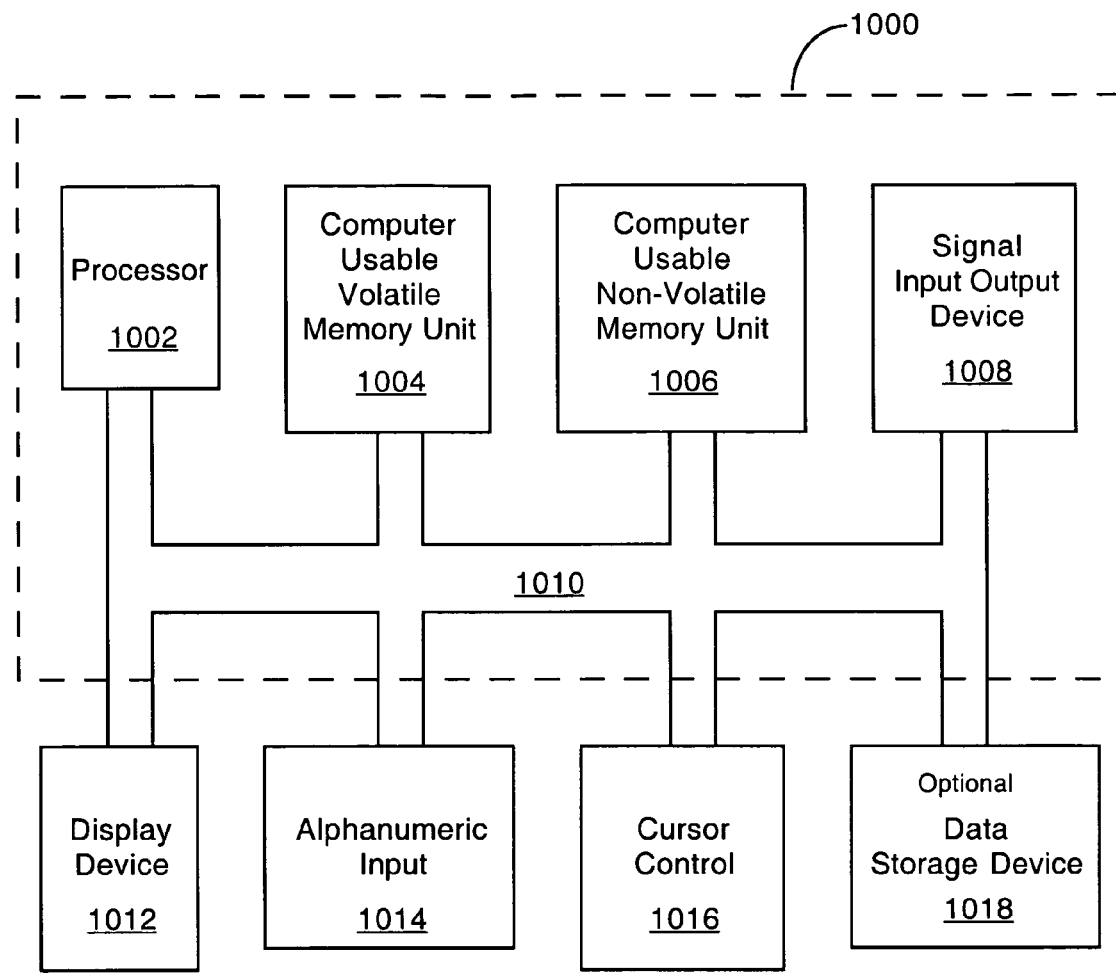
FIG. 10 is a block diagram of an exemplary computer system upon which embodiments of the present invention may be practiced.

Embodiments of the present invention may be comprised of computer-readable and computer-executable instructions that reside, for example, in computer-useable media of an electronic system, such as a peer system, a host computer system or an embedded system which may serve as a peer platform. FIG. 10 is a block diagram of an embodiment of an exemplary computer system 1000 used in accordance with the present invention. It should be appreciated that system 1000 is not strictly limited to be a computer system. As such, system 1000 of the present embodiment is well suited to be any type of computing device (e.g., server computer, portable computing device, desktop computer, etc.). Within the following discussions of the present invention, certain processes and steps are discussed that are realized, in one embodiment, as a series of instructions (e.g., software program) that reside within computer readable memory units of computer system 1000 and executed by a processor(s) of system 1000. When executed, the instructions cause computer 1000 to perform specific actions and exhibit specific behavior that is described in detail herein.

Computer system 1000 of FIG. 10 comprises an address/data bus 1010 for communicating information, one or more central processors 1002 coupled with bus 1010 for processing information and instructions. Central processor unit(s) 1002 may be a microprocessor or any other type of processor. The computer 1000 also includes data storage features such as a computer usable volatile memory unit 1004 (e.g., random access memory, static RAM, dynamic RAM, etc.) coupled with bus 1010 for storing information and instructions for central processor(s) 1002, a computer usable non-volatile memory unit 1006 (e.g., read only memory, programmable ROM, flash memory, EPROM, EEPROM, etc.) coupled with bus 1010 for storing static information and instructions for processor(s) 1002. System 1000 also includes one or more signal generating and receiving devices 1008 coupled with bus 1010 for enabling system 1000 to interface with other electronic devices and computer systems. The communication interface(s) 1008 of the present embodiment may include wired and/or wireless communication technology.

Computer system 1000 may include an optional alphanumeric input device 1014 including alphanumeric and function keys coupled to the bus 1010 for communicating information and command selections to the central processor(s) 1002. The computer 1000 includes an optional cursor control or cursor directing device 1016 coupled to the bus 1010 for communicating user input information and command selections to the central processor(s) 1002. The cursor-directing device 1016 may be implemented using a number of well known devices such as a mouse, a track-ball, a track-pad, an optical tracking device, and a touch screen, among others.

The system 1000 of FIG. 10 may also include one or more optional computer usable data storage devices 1018 such as a magnetic or optical disk and disk drive (e.g., hard drive or floppy diskette) coupled with bus 1010 for storing information and instructions. A display device 1012 is coupled to bus 1010 of system 1000 for displaying textual or graphical information, e.g., a graphical user interface, video and/or graphics. It should be appreciated that display device 1012 may be a cathode ray tube (CRT), flat panel liquid crystal display (LCD), field emission display (FED), plasma display or any other display device suitable for displaying video and/or graphic images and alphanumeric characters recognizable to a user.

Referring again to FIG. 2, in the present embodiment, the source systems 210, 230, 280, 250 and adapters 220, 240, 270, 250 may be executed on computer systems, such as computer system 1000. Similarly, the join engines 222 and 262 and object model 295 may be executed on computer systems, such as computer system 1000.

Thus, the present invention provides, in various embodiments, a method and system for global attribute mapping in an enterprise information system. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A network of peer-to-peer enterprise information systems comprising:
   a first source system for publishing a data change of an attribute of a first entity of the first source system, wherein said first entity is one of a first plurality of entities;
   a unified entity-relationship system comprising said first plurality of entities, said first plurality of entities each comprising a plurality of attributes;
   at least one subsumed entity-relationship system coupled to said unified entity-relationship system, wherein said first plurality of entities of said unified entity-relationship system are mapped to one another and to a second plurality of entities and attributes of said second plurality of entities of said subsumed entity-relationship system;
   a join engine peer coupled to said unified entity-relationship system for performing joins and splits to form related entities according to a join model;
   a global object model coupled to said join engine peer, said global object model comprising a first mapped relationship of said mapped relationships and said join model specifying transformations and queries required for forming a second entity from a set of related entities, wherein at least one of said set of related entities is obtained from a second source system, and wherein said first mapped relationship is used by said join engine peer to enforce data consistency between said first entity and said second entity; and
   a third source system for storing said data change in said second entity formed by said join engine peer.

2. The network of claim 1, wherein said second plurality of entities are mapped by automatically importing schemas of databases for said entities into said global object model and correlating relationships between related entities.

3. A network as described in claim 2 wherein the attributes of said first entity of said subsumed entity-relationship system are mapped to corresponding attributes of entities of said unified entity-relationship system.

4. A network as described in claim 2, wherein a subset of the attributes of said first entity of said subsumed entity-relationship system are mapped to corresponding attributes of entities of said unified entity-relationship.

5. A network as described in claim 2, wherein said first entity in said unified entity-relationship system is mapped a plurality of times to a corresponding individual entity within a plurality of subsumed entity-relationship systems.

6. A network as described in claim 2, wherein said first entity within said unified entity-relationship system is mapped to said set of related entities within a single subsumed entity-relationship system, said unified entity-relationship system being mapped to a different set of attributes for each of said set of related entities.

7. A network as described in claim 2, wherein said global object model is maintained in a versioned store.

8. A network as described in claim 7, wherein join engines throughout said network maintain a copy of said object model obtained from said versioned store.

9. A network as described in claim 2, wherein said schemas are hierarchical.

10. A network as described in claim 9, wherein a schema is extended from a parent class entity to a child class entity based on user-defined parent-child inheritance relationships.

11. A network as described in claim 10, wherein said child class entity inherits relationships from said parent class entity.

12. A network as described in claim 1, wherein said set of related entities are marked for cascading deletes.

13. A network as described in claim 12, wherein a deletion of said first entity results in the automatic deletion of related entities that are marked for cascading deletes.

14. A method of forming a global attribute object model in a network of connected enterprise information systems comprising:
   mapping entities within a unified entity-relationship system to entities within subsumed entity-relationship systems;
   specifying relationships between mapped entities to generate a unified entity-relationship model;
   publishing a data change of an attribute of a first entity stored on a first source system, wherein said first entity is one of said entities within said subsumed entity-relationship systems; and
   using said global attribute object model, comprising a first mapped relationship, in conjunction with a join model for enforcing data consistency within said network by:
      forming, by said join engine peer, a second entity from a set of related entities, wherein at least one of said set of related entities is obtained from a second source system; and
      using said first mapped relationship to enforce said data consistency between said first entity and said second entity; and
   storing said data change in said second entity on a third source system.

15. The method as described in claim 14 wherein said second plurality of entities are mapped by importing schemas of databases for said entities into said global attribute object model and correlating relationships between related entities.

16. A method as described in claim 15 wherein all of the attributes of said first entity of said subsumed entity-relationship system are mapped to corresponding attributes of entities of said unified entity-relationship system.

17. A method as described in claim 15 wherein a subset of the attributes of said first entity of said subsumed entity-relationship system are mapped to corresponding attributes of entities of said unified entity-relationship system.

18. A method as described in claim 15 wherein said first entity in said unified entity-relationship system is mapped a plurality of times to a corresponding individual entity within a plurality of subsumed entity-relationship systems.

19. A method as described in claim 15 wherein said first entity within said unified entity-relationship system is mapped to said set of related entities within a single subsumed entity-relationship system, said unified entity-relationship system being mapped to a different set of attributes for each of said set of related entities.

20. The method as described in claim 14 wherein said global attribute object model is maintained in a versioned store for allowing users to deploy a specific version compatible with their system configuration.

21. A method as described in claim 20 further comprising maintaining a copy of said global attribute object model within a plurality of join engine peers.

22. A method as described in claim 15 wherein said schemas are hierarchical.

23. A method as described in claim 22 wherein a schema is extended from a parent class entity to a child class entity based on user-defined parent-child inheritance relationships.

24. A method as described in claim 23 wherein said child class entity inherits relationships from said parent class entity.

25. A method as described in claim 14 wherein said set of related entities are marked for cascading deletes.

26. A method as described in claim 25 wherein a deletion of said first entity results in the automatic deletion of related entities that are marked for cascading deletes.

27. A computer-usable medium having computer-readable program code embodied therein for causing a computer to perform a method of communicating data within a network of peer-to-peer enterprise information systems, said method comprising:

mapping entities within a unified entity-relationship system to entities within subsumed entity-relationship systems;

implementing user-specified relationships between mapped entities to generate a unified entity-relationship model;

publishing a data change of an attribute of a first entity stored on a first source system, wherein said first entity is one of said entities within said subsumed entity-relationship systems; and using said global attribute object model, comprising a first mapped relationship, in conjunction with a join model for enforcing data consistency within said network by:

forming, by said join engine peer, a second entity from a set of related entities, wherein at least one of said set of related entities is obtained from a second source system; and using said first mapped relationship to enforce said data consistency between said first entity and said second entity; and storing said data change in said second entity on a third source system.

28. The computer-usable medium as described in claim 27 wherein said second plurality of entities are mapped by automatically importing schemas of databases for said entities into said global attribute object model and correlating relationships between related entities.

29. A computer-usable medium as described in claim 28 wherein the attributes of said first entity of said subsumed entity-relationship system are mapped to corresponding attributes of entities of said unified entity-relationship system.

30. A computer-usable medium as described in claim 28 wherein a subset of the attributes of said first entity of said subsumed entity-relationship system are mapped to corresponding attributes of entities of said unified entity-relationship system.

31. A computer-usable medium as described in claim 28 wherein said first entity in said unified entity-relationship system is mapped a plurality of times to a corresponding individual entity within a plurality of subsumed entity-relationship systems.

32. A computer-usable medium as described in claim 28 wherein said first entity within said unified entity-relationship system is mapped to said set of related entities within a single subsumed entity-relationship system, said unified entity-relationship system being mapped to a different set of attributes for each of said set of related entities.

33. A computer-usable medium as described in claim 28 wherein said global attribute object model is maintained in a versioned store for allowing users to deploy a specific version compatible with their system configuration.

34. A computer-usable medium as described in claim 33 further comprising maintaining a copy of said global attribute object model within a plurality of join engine peers.

35. A computer-usable medium as described in claim 28 wherein said schemas are hierarchical.

36. A computer-usable medium as described in claim 35 wherein a schema is extended from a parent class entity to a child class entity based on used-defined parent-child inheritance relationships.

37. A computer-usable medium as described in claim 36 wherein said child class entity inherits relationships from said parent class entity.

38. A computer-usable medium as described in claim 27 wherein said set of related entities are marked for cascading deletes.

39. A computer-usable medium as described in claim 38 wherein a deletion of said first entity results in the automatic deletion of said set of related entities that are marked for cascading deletes.

* * * * *